US010920401B2

(12) United States Patent
O'Donnell (10) Patent No.: US 10,920,401 B2
(45) Date of Patent: Feb. 16, 2021

(54) MANAGING WORK AREA RESERVATIONS FOR AUTONOMOUS VEHICLES

(71) Applicant: Caterpillar Paving Products Inc., Brooklyn Park, MN (US)

(72) Inventor: Timothy O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 260 days.

(21) Appl. No.: 16/046,041

(22) Filed: Jul. 26, 2018

(65) Prior Publication Data

US 2020/0032484 A1 Jan. 30, 2020

(51) Int. Cl.
*E02F 9/20* (2006.01)
*G05D 1/00* (2006.01)
*G05D 1/02* (2020.01)

(52) U.S. Cl.
CPC ............ *E02F 9/2054* (2013.01); *E02F 9/205* (2013.01); *G05D 1/0088* (2013.01); *G05D 1/0214* (2013.01); *G05D 2201/0202* (2013.01)

(58) Field of Classification Search
CPC ...... E02F 9/2054; E02F 9/205; G05D 1/0088; G05D 1/0214; G05D 2201/0202
USPC .......................................................... 701/25
See application file for complete search history.

(56) References Cited

U.S. PATENT DOCUMENTS

| | | | | |
|---|---|---|---|---|
| 6,363,632 | B1 * | 4/2002 | Stentz | E02F 3/437 37/414 |
| 6,625,540 | B2 * | 9/2003 | Kageyama | B60W 40/04 701/301 |
| 9,377,779 | B2 | 6/2016 | Tojima et al. | |
| 9,828,748 | B2 * | 11/2017 | Hiranaka | G05D 1/02 |
| 9,864,375 | B1 * | 1/2018 | Kirkhope | G05B 19/05 |
| 9,905,133 | B1 * | 2/2018 | Kumar | G07C 5/008 |
| 10,480,131 | B1 * | 11/2019 | McAlpine | E01C 19/48 |
| 2002/0143461 | A1 * | 10/2002 | Burns | G08G 1/207 701/117 |
| 2017/0100981 | A1 * | 4/2017 | Muir | E01C 23/088 |
| 2017/0168501 | A1 * | 6/2017 | Ogura | G05D 1/0278 |
| 2017/0177002 | A1 * | 6/2017 | Ogura | A01B 69/008 |
| 2018/0038057 | A1 * | 2/2018 | Hogan | E01C 21/00 |
| 2019/0033877 | A1 * | 1/2019 | Wei | G05D 1/0221 |
| 2019/0233007 | A1 * | 8/2019 | Hogan | B62D 15/024 |
| 2019/0368135 | A1 * | 12/2019 | O'Donnell | E01C 23/07 |
| 2020/0019192 | A1 * | 1/2020 | O'Donnell | G05D 3/20 |
| 2020/0032484 | A1 * | 1/2020 | O'Donnell | G05D 1/0214 |
| 2020/0050192 | A1 * | 2/2020 | O'Donnell | G05D 1/0295 |

(Continued)

*Primary Examiner* — Peter D Nolan
*Assistant Examiner* — Wae L Louie
(74) *Attorney, Agent, or Firm* — Harrity & Harrity LLP (57) ABSTRACT

System and methods for managing work area reservations are disclosed. A system may receive an indication of a work area to be reserved for an autonomous operation of the autonomous vehicle; broadcast a request to reserve the work area for the autonomous vehicle; determine whether a communication, that indicates a reservation conflict for the work area, has been received; selectively reserve the work area and instructing one or more controllers of the autonomous vehicle to perform the autonomous operation in the work area based on determining whether the communication has been received by the autonomous vehicle; and broadcast, during the autonomous operation, one or more signals identifying the work area.

20 Claims, 6 Drawing Sheets

(56) References Cited

U.S. PATENT DOCUMENTS

2020/0050197 A1* 2/2020 O'Donnell ............. G05D 1/024
2020/0070816 A1* 3/2020 O'Donnell ........... G05D 1/0255
2020/0089230 A1* 3/2020 Oetken ................ G05D 1/0229
2020/0103906 A1* 4/2020 O'Donnell ........... G05D 1/0278
2020/0117201 A1* 4/2020 Oetken ................ G05D 1/0285

* cited by examiner

MANAGING WORK AREA RESERVATIONS FOR AUTONOMOUS VEHICLES

TECHNICAL FIELD

The present disclosure relates generally to systems and methods for work area reservation, more particularly, to system and methods for managing work area reservations for autonomous vehicles.

BACKGROUND

When autonomous vehicles are used at a work site, special care must be taken to avoid collisions of the autonomous vehicle with other objects. One device for preventing vehicle interference is described in U.S. Pat. No. 6,625,540 (the '540 patent) assigned to Komatsu Ltd., which issued on Sep. 23, 2003. The '540 patent describes "a vehicle interference prevention device that, by computing a range of possible locations of a vehicle taking into consideration the time at which the location of the vehicle is measured, can safely predict the location of the vehicle, even with minimal frequency of radio contact, and prevent interference among unmanned vehicles or manned vehicles over the entirety of a large work site." Although the device of the '540 patent may provide a way of preventing interference among some vehicles, it may be less than optimal, for example, for managing work area reservations and resolving work area reservation conflicts.

The disclosed system is directed to overcoming one or more of the problems set forth above and/or other problems of the prior art.

SUMMARY

According to some implementations, the present disclosure is related to a method of managing autonomous vehicle work area reservations performed by an autonomous vehicle. The method may include determining a work area to be reserved for an autonomous operation of the autonomous vehicle; broadcasting a request to reserve the work area for the autonomous vehicle; determining whether a communication, that indicates a reservation conflict for the work area, has been received by the autonomous vehicle; selectively reserving the work area and performing the autonomous operation in the work area based on determining whether the communication has been received by the autonomous vehicle; broadcasting, during the autonomous operation, one or more signals identifying the work area; determining that the autonomous operation has been completed; and stopping the broadcasting of the one or more signals identifying the work area based on determining that the autonomous operation has been completed.

According to some implementations, the present disclosure is related to a system, included in an autonomous vehicle, for managing work area reservations of the autonomous vehicle. The system may include a wireless communication component and one or more processors operatively coupled to the wireless communication component. The wireless communication component and the one or more processors may be configured to: receive an indication of a work area to be reserved for an autonomous operation of the autonomous vehicle; broadcast a request to reserve the work area for the autonomous vehicle; determine whether a communication, that indicates a reservation conflict for the work area, has been received; selectively reserve the work area and instructing one or more controllers of the autonomous vehicle to perform the autonomous operation in the work area based on determining whether the communication has been received by the autonomous vehicle; and broadcast, during the autonomous operation, one or more signals identifying the work area.

According to some implementations, the present disclosure is related to a method of managing autonomous vehicle work area reservations performed by a first vehicle. The method may include receiving, via a communication link with a vehicle, a component identifier that identifies a component of the vehicle and a vehicle identifier that identifies the vehicle. The method may include determining a first work area associated with an autonomous operation of the first vehicle; detecting a conflict with a second vehicle for the first work area; negotiating, with the second vehicle, a work area modification associated with the first work area or a second work area associated with the second vehicle, wherein the work area modification includes at least one of: a modification to a size of the first work area, a modification to a size of the second work area, a modification to a first work schedule of the first vehicle with respect to the first work area, or a modification to a second work schedule of the second vehicle with respect to the first work area; determining a modified work area based on the work area modification; and reserving the modified work area and performing the autonomous operation in the modified work area based on determining the modified work area.

Other features and implementations of this disclosure will be apparent from the following description and the accompanying drawings.

DETAILED DESCRIPTION

Figure 1:
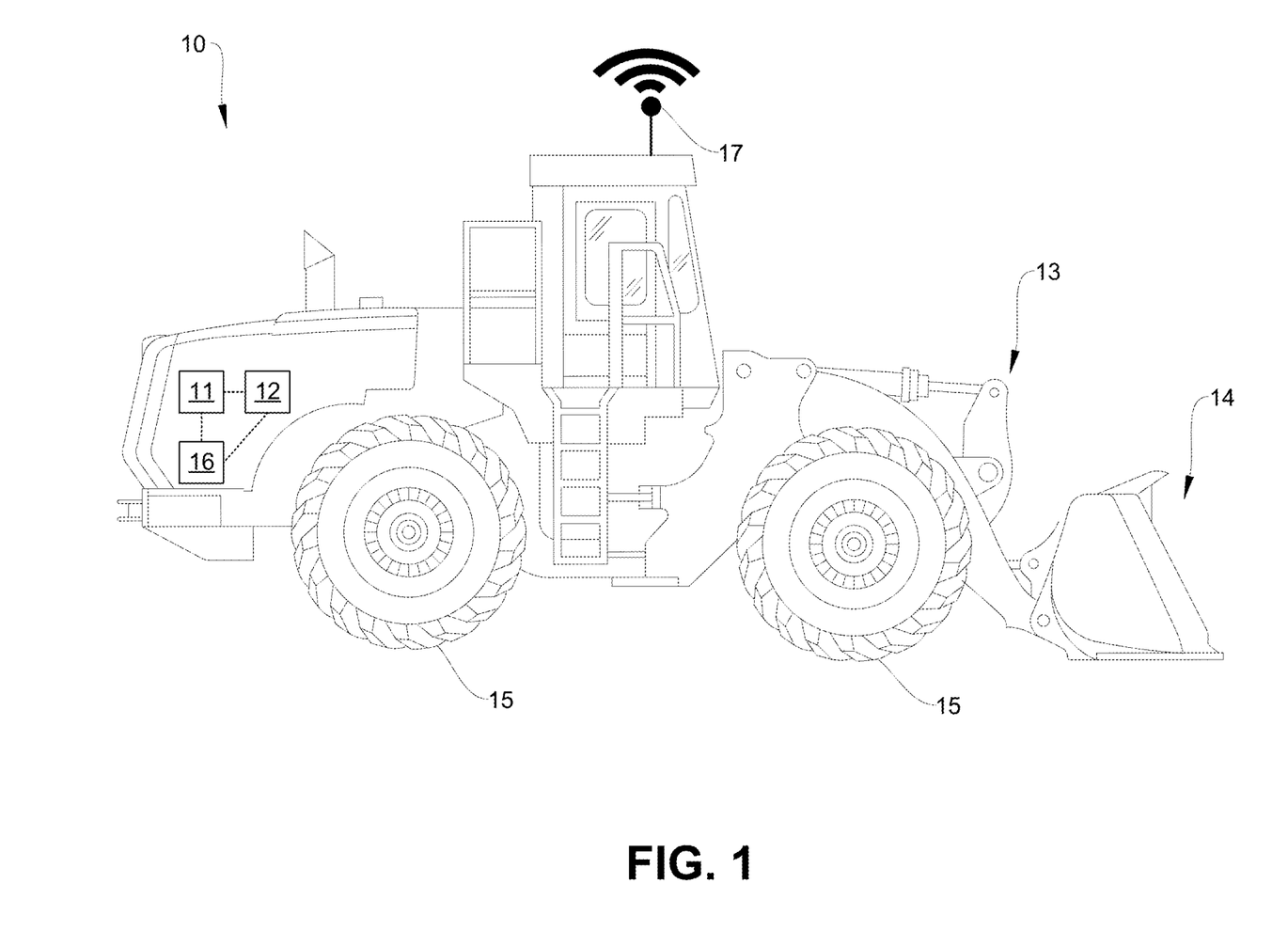
FIG. 1 is a diagram of an example vehicle.

FIG. 1 is a diagram of an example vehicle 10. Vehicle 10 may be, for example, a vehicle that performs some type of operation associated with an industry such as mining, construction, farming, transportation, or any other industry known in the art. Vehicle 10 may be an earth moving vehicle such as a loader, as illustrated in FIG. 1. Although vehicle 10 is embodied as a loader in the illustrated implementation of FIG. 1, aspects of the present disclosure are equally applicable to other types of mobile vehicles such as, for example, pavers, scrapers, motor graders, dozers, rollers, trucks, diggers, excavators, and/or the like. In some implementations, vehicle 10 may be an autonomous vehicle (e.g., an unmanned vehicle, a semi-autonomous vehicle, and/or the like) that performs operations using various sensors and/or controllers without an on-board operator and/or an operator directly controlling vehicle 10 via remote control.

Vehicle 10 may include, among other things, a drive system 11, a transmission system 12, an implement linkage system 13, a work implement 14 (e.g., a bucket, a shovel, a scraper, and/or the like), multiple ground engaging members, and a global positioning system (GPS) component 17. The ground engaging members may be in the form of tracks for a track-type vehicle or a set of wheels 15, as shown in FIG. 1.

Drive system 11 may include an engine. Transmission system 12 may include gears, differential systems, axles, and/or other components that are coupled to drive system 11 and wheels 15 of vehicle 10. Transmission system 12 may be configured to transfer power from drive system 11 to wheels 15 in order to drive vehicle 10. Implement linkage system 13 may be operatively coupled to work implement 14. Implement linkage system 13 may include hydraulically actuated linkages that enable articulation, linkage, and/or use of work implement 14 during operation. Work implement 14 may operatively perform functions such as, but not limited to, hauling, dumping, and/or removing materials. GPS component 17 may include, for example, a GPS antenna, a GPS receiver, and/or the like, and may be used to determine a location of the vehicle 10. In some implementations, vehicle 10 may include a management system 16, as described in more detail below.

As indicated above, FIG. 1 is provided as an example. Other examples are possible and may differ from what was described in connection with FIG. 1.

Figure 2:
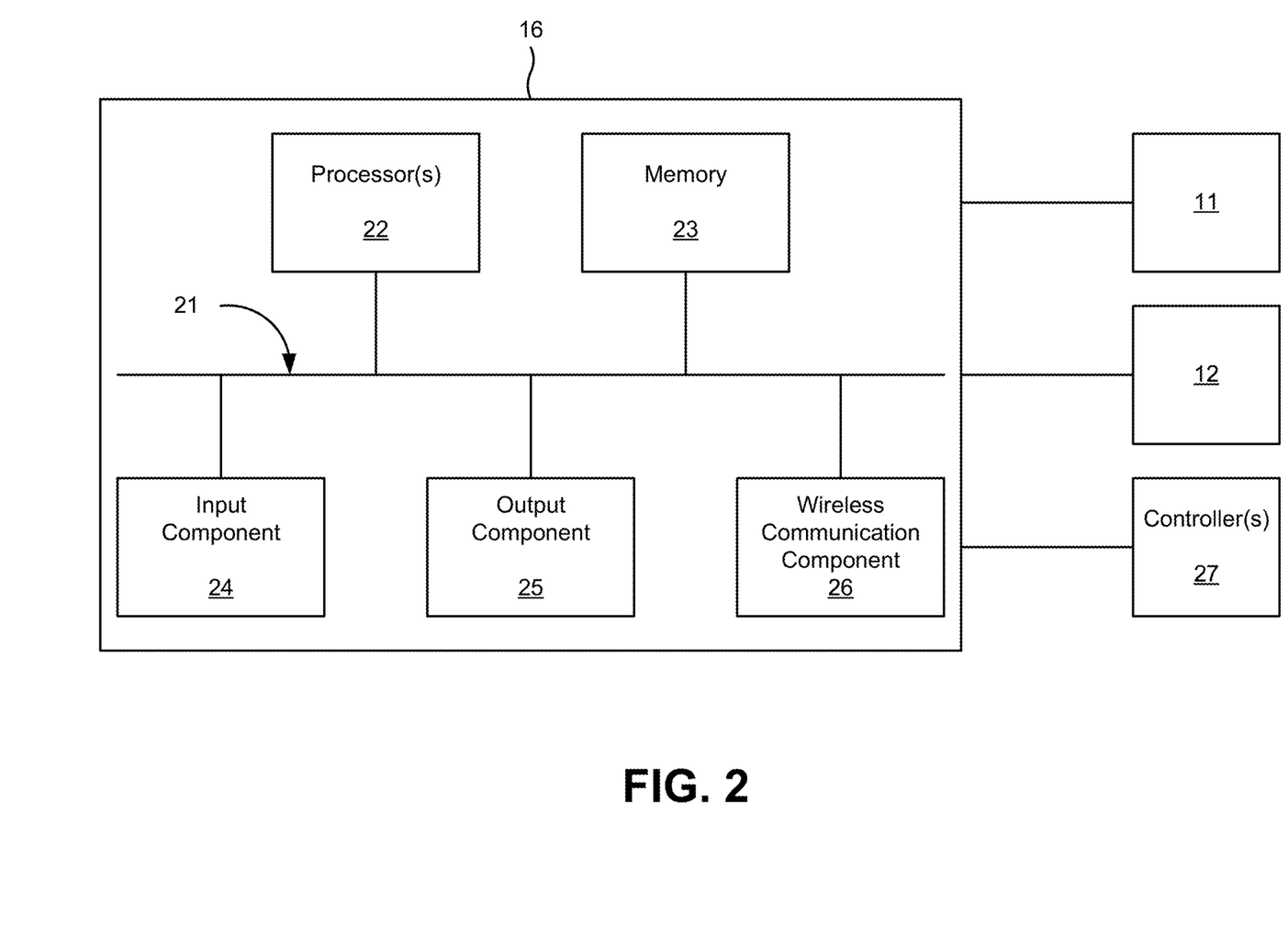
FIG. 2 is a diagram of an example management system for managing work area reservations of the vehicle of FIG. 1.

FIG. 2 is a diagram of an example management system 16 for monitoring components of the vehicle of FIG. 1. As shown in FIG. 2, management system 16 may include a bus 21, a processor 22, a memory 23, an input component 24, an output component 25, and a wireless communication component 26. In some implementations, one or more of these components may be used as means for performing one or more operations described herein, such as process 50 of FIG. 5, process 60 of FIG. 6, and/or the like.

Bus 21 includes a component that permits communication among the components of management system 16. Processor 22 is implemented in hardware, firmware, or a combination of hardware and software. Processor 22 is a central processing unit (CPU), a microprocessor, a microcontroller, a field-programmable gate array (FPGA), an application-specific integrated circuit (ASIC), or another type of processing component. In some implementations, processor 22 includes one or more processors capable of being programmed to perform a function. Memory 23 includes a random access memory (RAM), a read only memory (ROM), a hard disk, a flash drive, and/or another type of dynamic or static storage device (e.g., a flash memory, a magnetic memory, and/or an optical memory) that stores information and/or instructions for use by processor 22.

Input component 24 includes a component that permits management system 16 to receive information, such as via operator input (e.g., a touch screen display, a keypad, a button, a switch, a microphone, and/or the like). Additionally, or alternatively, input component 24 may include a sensor for sensing information (e.g., a global positioning system (GPS) component 17, an accelerometer, a gyroscope, a motion sensor, a LIDAR sensor, and/or the like). Output component 25 includes a component that provides output information from management system 16 (e.g., a display, a speaker, a light-emitting diode (LED), and/or the like).

Wireless communication component 26 includes a transceiver and/or a separate receiver and transmitter that enables management system 16 to communicate with other devices, such as via a wireless connection, or a combination of wired and wireless connections. For example, wireless communication component 26 may include a radio frequency (RF) interface, a universal serial bus (USB) interface, a wireless local area network interface, a cellular network interface, and/or the like. In some implementations, wireless communication component 26 includes an antenna for wireless communication.

Figure 5:
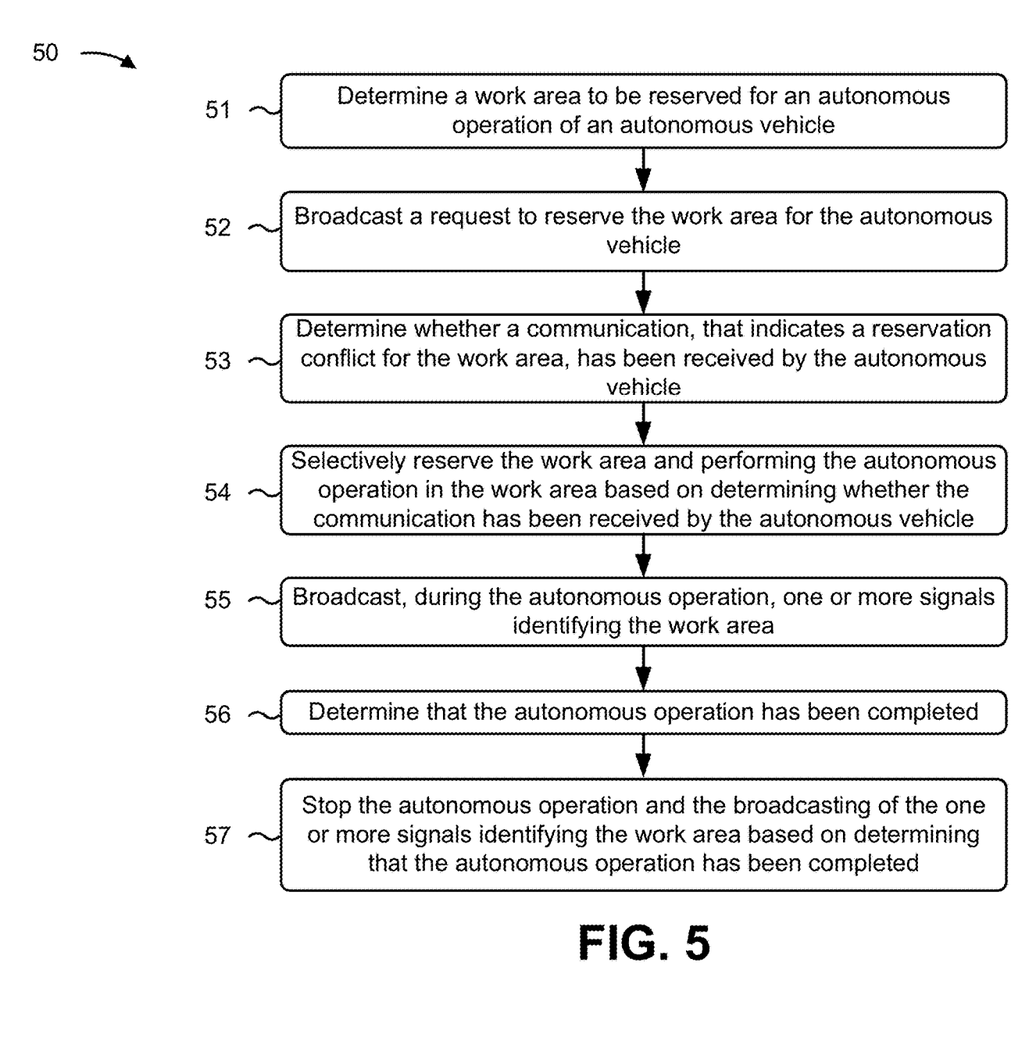
FIG. 5 is a diagram of an example process performed in association with the management system of FIG. 2.
Figure 6:
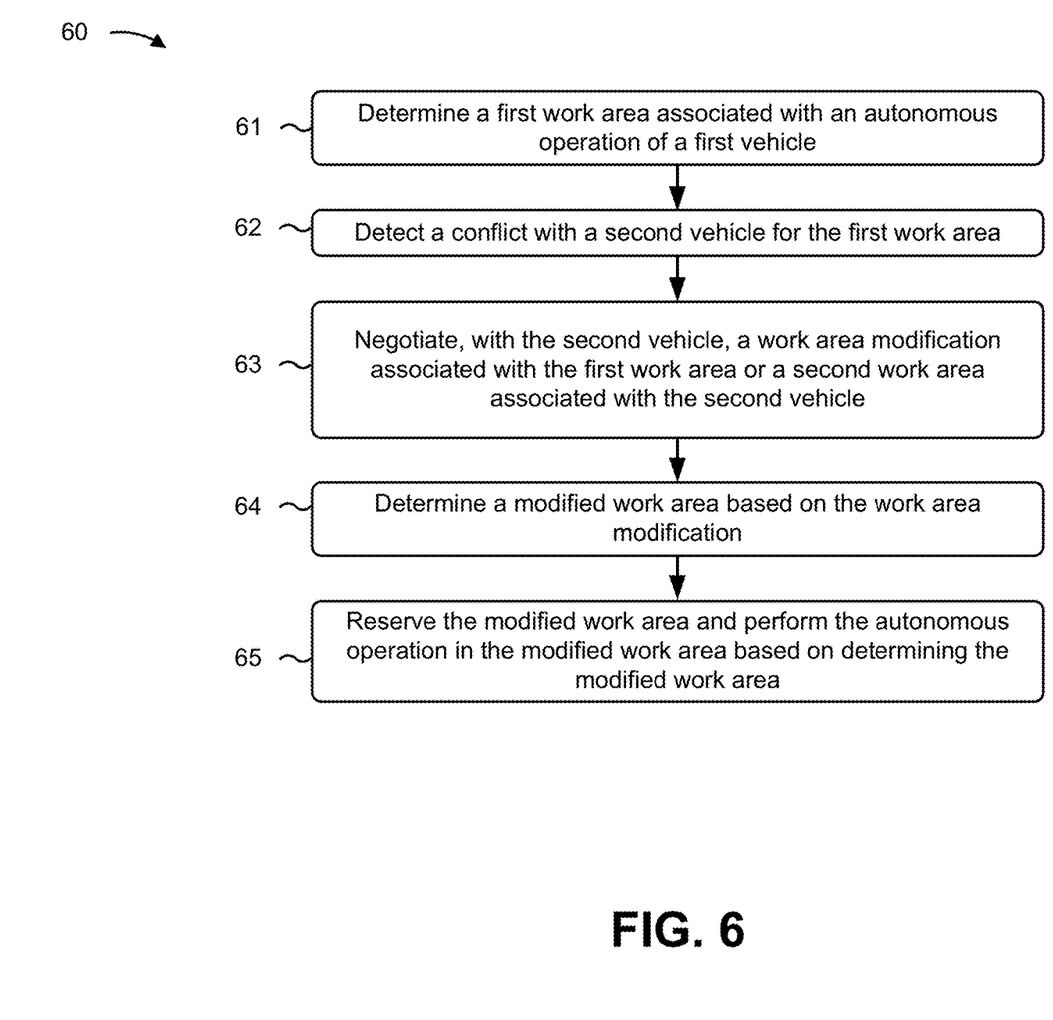
FIG. 6 is a diagram of another example process performed in association with the management system of FIG. 2.

Management system 16 may perform one or more processes described herein, such as process 50 of FIG. 5, process 60 of FIG. 6, and/or one or more other processes described herein. Management system 16 may perform these processes based on processor 22 executing software instructions stored by a non-transitory computer-readable medium, such as memory 23. A computer-readable medium is defined herein as a non-transitory memory device. A memory device includes memory space within a single physical storage device or memory space spread across multiple physical storage devices. In some implementations, software instructions may be read into memory 23. When executed, software instructions stored in memory 23 may cause processor 22 to perform one or more processes described herein.

As shown, management system 16 may interface with various systems of vehicle 10 (e.g., drive system 11, transmission system 12, implement linkage system 13, work implement 14, wheels 15, and/or the like) and/or one or more controllers 27 of vehicle 10. A controller 27 includes one or more components, for controlling operation of the vehicle 10 and/or a system of vehicle 10. For example, controller 27 may include a processing component similar to processor 22, an actuator, and/or the like.

The number and arrangement of components shown in FIG. 2 are provided as an example. In practice, management system 16 may include additional components, fewer components, different components, or differently arranged components than those shown in FIG. 2. Additionally, or alternatively, a set of components (e.g., one or more components) of management system 16 may perform one or more functions described as being performed by another set of components of management system 16.

Figure 3:
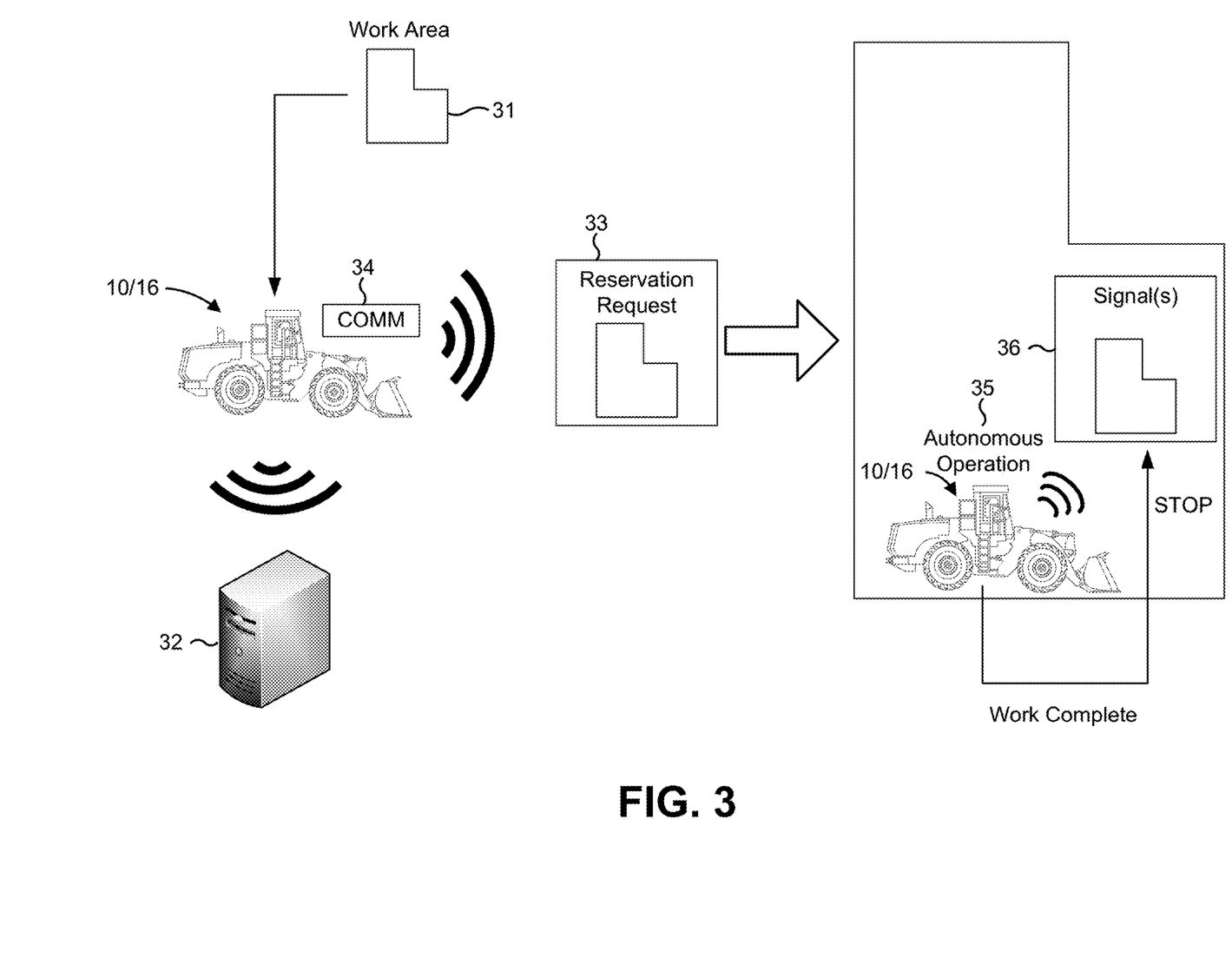
FIG. 3 is a diagram of example operations performed by the management system of FIG. 2 and/or the vehicle of FIG. 1.

FIG. 3 is a diagram of example operations performed by management system 16 and/or vehicle 10. While some operations are described in connection with FIG. 3 as being performed by vehicle 10, one or more of those operations may be performed by management system 16, in some implementations.

As shown in FIG. 3, the vehicle 10 may determine a work area 31 to be reserved for an autonomous operation of the vehicle 10. A work area 31 may be defined by a set of geographic coordinates, which may define a boundary of the work area 31. In some implementations, information that identifies the work area 31 may be input by an operator (e.g., using input component 24, information input to memory 23, and/or the like). Additionally, or alternatively, information that identifies the work area 31 may be received from a server 32, such as a command and control center server, a central server, a back office server, and/or the like. Additionally, or alternatively, an operator may define a boundary of a work area 31 by driving the vehicle 10 (e.g., physically or remotely) around the boundary of the work area 31.

As further shown in FIG. 3, the vehicle 10 may broadcast a request 33 to reserve the work area 31 for the vehicle 10. The request 33 may include work area information that identifies, for example, a set of geographic coordinates that define a boundary of the work area 31, a work schedule requested by the vehicle 10 for working in the work area 31, a type of work to be performed by the vehicle 10, a vehicle type of the vehicle 10, a size of the vehicle 10, a speed of the vehicle 10, a location of the vehicle 10 (e.g., within the work area 31), and/or the like. A work schedule may indicate, for example, one or more time periods that the vehicle 10 is expected to be in the work area 31, an expected amount of time that the vehicle 10 is expected to be in the work area 31, one or more geographic coordinates corresponding to one or more locations where the vehicle 10 is expected to be within the work area 31 at different times, a path that the vehicle 10 is expected to take within the work area 31 during a particular time period, and/or the like.

In some implementations, the vehicle 10 may broadcast the request 33 to other vehicles and/or devices (e.g., wearable devices, infrastructure, a command center, and/or the like) within a vicinity of the vehicle 10, such as by using a vehicle-to-everything (V2X) communication (e.g., a vehicle-to-vehicle (V2V) communication, a vehicle-to-person (V2P) communication, a vehicle-to-infrastructure (V2I) communication, and/or the like) and/or a similar type of communication.

Additionally, or alternatively, the vehicle 10 may broadcast the request 33 to a server 32, such as via a wireless communication or a combination of a wired communication and a wireless communication. In some implementations, the server 32 may store information regarding work area reservations (e.g., similar to the information that may be included in the request 33) for one or more vehicles (e.g., other than the vehicle 10). In some implementations, the server 32 may be located on a same work site as the vehicle 10. In some implementations, the server 32 may be located remotely from the vehicle 10 (e.g., in a data center, a command and control center located remotely from the work site, and/or the like).

As further shown in FIG. 3, the vehicle 10 may determine whether a communication 34, that indicates a conflict for the work area 31, has been received by the vehicle 10. A conflict may occur, for example, if a time period during which the vehicle 10 is to be present in the work area 31 overlaps with (e.g., partially or wholly) a time period during which one or more other vehicles are to be present in the work area 31 (e.g., the entire work area 31 or a portion of the work area 310).

In some implementations, the vehicle 10 may receive the communication 34 from another vehicle (e.g., via a V2X communication and/or the like), which may be referred to as an intruding vehicle and may include, for example, a type of vehicle described above in connection with FIG. 1. For example, the intruding vehicle may receive the request 33 from the vehicle 10, may determine that the request 33 to reserve the work area 31 conflicts with a work area and/or work schedule of the intruding vehicle, and may transmit the communication 34, indicating the conflict, based on this determination. Additionally, or alternatively, the intruding vehicle may respond to the request 33 with information regarding the intruding vehicle (e.g., information similar to that described above as being included in the request 33), and the vehicle 10 may determine that there is a conflict based on the information included in the response.

Additionally, or alternatively, the vehicle 10 may receive the communication 34 from the server 32 (e.g., via a wireless communication or a combination of wired and wireless communications). For example, the server 32 may receive the request 33 from the vehicle 10, may determine that the request 33 to reserve the work area 31 conflicts with a work area and/or work schedule of one or more other vehicles, and may transmit the communication 34, indicating the conflict, based on this determination. In some implementations, the communication 34 may identify the vehicle(s) associated with the conflict, and/or may include work area information about these vehicle(s), as described above in connection with the request 33.

The vehicle 10 may selectively reserve the work area 31 and/or perform an autonomous operation 35 in the work area 31 based on determining whether the communication 34 has been received by the vehicle 10. For example, if the vehicle 10 receives the communication 34 (e.g., within a threshold time after transmission of the request 33), then the vehicle 10 may perform one or more operations to resolve the conflict, as described below in more detail in connection with FIG. 4. However, if the vehicle 10 does not receive a communication 34 (e.g., within a threshold time after transmission of the request 33), then the vehicle 10 may reserve the work area 31, and/or may perform one or more autonomous operations 35 in the work area 31 (e.g., for the duration of time associated with the reservation). In some implementations, the communication 34 (e.g., from another vehicle and/or the server 32) may indicate that there is no conflict associated with the work area, in which case the vehicle 10 may reserve the work area 31 and/or perform an autonomous operation 35 within the work area 31. In some implementations, the vehicle 10 may sense one or more other vehicles and/or people (e.g., via wearable devices) in proximity of the vehicle 10, and may proceed with processing once all of the vehicle(s) and/or people (e.g., via wearable devices) have responded to the request 33.

In some implementations, the vehicle 10 may reserve the work area 31 by storing information locally to confirm the reservation and/or transmitting information confirming the reservation to the server 32. Such information may be stored (e.g., by vehicle 10 and/or server 32), and may be used to manage conflicts with other vehicles, such as when a request 33 is received from another vehicle.

As further shown in FIG. 3, the vehicle 10 may perform one or more autonomous operations 35 within the work area 31, such as moving, paving, scraping, rolling, excavating, milling, removing material, hauling material, placing material, and/or the like. In some implementations, management system 16 may instruct one or more controllers 27 and/or other components of vehicle 10 to perform the autonomous operation 35.

During the autonomous operation, the vehicle 10 may broadcast one or more signals 36 that identify the work area 31, that indicate that the vehicle 10 is operating in the work area 31, that indicate that the work area 31 is reserved for the vehicle 10, that indicate a current geographic location of the vehicle 10 within the work area 31, that indicate a current operating status of the vehicle within the work area, that indicate a remaining amount of time until the vehicle 10 is scheduled to complete operations within the work area 31, and/or the like. A signal 36 may include work area information, as described above in connection with the request 33. In some implementations, the vehicle 10 may transmit a signal 36 periodically. Additionally, or alternatively, the vehicle 10 may transmit a signal 36 based on a triggering event, such as a change in direction of the vehicle 10, a change in speed of the vehicle 10, a change in a type of operation or work being performed by the vehicle 10, and/or the like. By transmitting such signals 36 during autonomous operation 35 in the work area 31, the vehicle 10 may alert other vehicles to avoid the work area 31 (or a geographic location of the work area 31 in which the vehicle 10 is performing operations), and/or may perform one or more operations to resolve any conflicts that may occur with respect to the work area 31, as described below in more detail in connection with FIG. 4.

As further shown in FIG. 3, the vehicle 10 may determine that the autonomous operation 35 and/or the work in the work area 31 has been completed. For example, the vehicle 10 may complete a programmed task (e.g., stored in memory 23 of management system 16). Based on determining that the autonomous operation 35 has been completed, the vehicle 10 may stop broadcasting further signals 36. Additionally, or alternatively, the vehicle 10 may leave the work area 31, may indicate that the work area 31 is no longer reserved, and/or the like. In some implementations, the vehicle 10 may indicate that the work area 31 is no longer reserved by storing, deleting, or updating information locally and/or by transmitting an indication to the server 32.

As indicated above, FIG. 3 is provided as an example. Other examples are possible and may differ from what was described in connection with FIG. 3.

Figure 4:
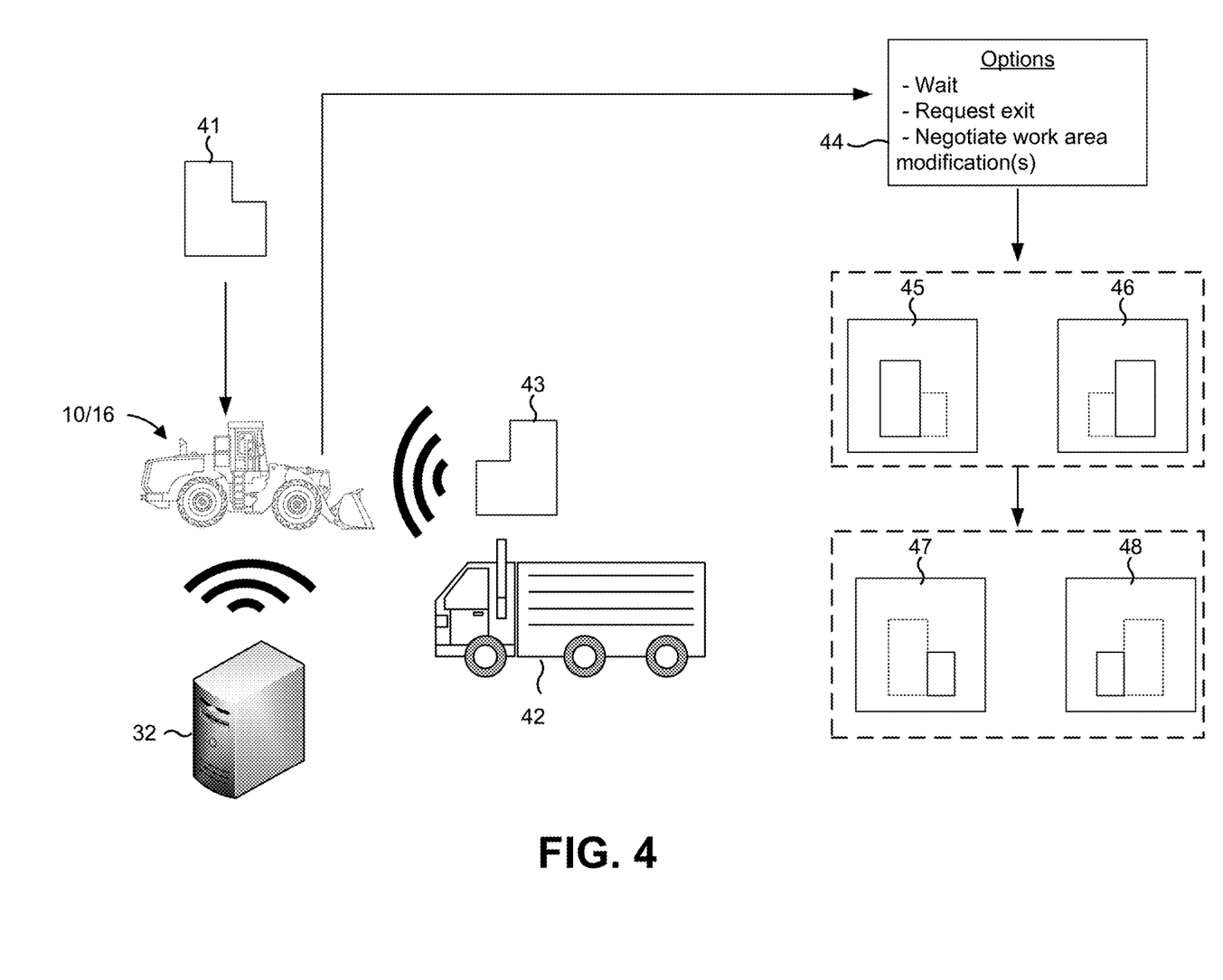
FIG. 4 is a diagram of other example operations performed by the management system of FIG. 2 and/or the vehicle of FIG. 1.

FIG. 4 is a diagram of other example operations performed by management system 16 and/or vehicle 10. While some operations are described in connection with FIG. 4 as being performed by vehicle 10, one or more of those operations may be performed by management system 16, in some implementations.

As shown in FIG. 4, the vehicle 10 may determine a first work area 41 to be reserved for an autonomous operation of the vehicle 10, in a similar manner as described above in connection with the work area 31 of FIG. 3. In some cases, the vehicle 10 may detect a conflict for the first work area 41. For example, the conflict may be detected based on a communication 34 in response to a request 33 to reserve the first work area 41 (e.g., prior to reserving the first work area 41), as described above in connection with FIG. 3. Additionally, or alternatively, the conflict may be detected during autonomous operation 35 (e.g., after reserving the first work area 41). For example, the conflict may be detected by receiving a communication 34 in response to a signal 36 transmitted during the autonomous operation 35. Additionally, or alternatively, the conflict may be detected by sensing an intruding object (e.g., an intruding vehicle, an intruding person, an intruding machine, and/or the like) in the first work area 41, such as by using one or more sensors (e.g., a camera, a radar system, a lidar system, and/or the like).

In some implementations, the vehicle 10 may receive a communication 34 from a second vehicle 42 (e.g., an intruding vehicle) that has a conflict with the first work area 41. The communication 34 may identify a second work area 43 (e.g., using a set of geographic coordinates and/or the like) associated with the second vehicle 42. Additionally, or alternatively, the communication 34 may include work area information associated with the second work area 43, such as a set of geographic coordinates that define a boundary of the second work area 43, a work schedule associated with the second vehicle 42, a type of work to be performed by the second vehicle 42, a vehicle type of the second vehicle 42, a size of the second vehicle 42, a speed of the second vehicle 42, a location of the second vehicle 42 (e.g., within the second work area 43), and/or the like. Additionally, or alternatively, the vehicle 10 may receive such communication 34 from the server 32.

The vehicle 10 (and/or the second vehicle 42) may perform one or more conflict resolution operations 44 based on the first work area 41, work area information associated with the first work area 41, the second work area 43, and/or work area information associated with the second work area 43. A conflict resolution operation 44 for the vehicle 10 may include, for example, waiting for the second vehicle 42 to exit the first work area 41 (e.g., and detecting such exit using one or more sensors and/or one or more communications with the second vehicle 42), requesting that the second vehicle 42 exit the first work area 41 (e.g., by transmitting a communication to the second vehicle 42), negotiating a work area modification with the second vehicle 42 (e.g., by transmitting and/or receiving one or more communications with the second vehicle 42), requesting operator input to resolve the conflict (e.g., by transmitting a communication to the server 32 and/or via an output component 25, and/or the like).

In some implementations, the vehicle 10 may determine an expected amount of time that the second vehicle 42 is to be present in the first work area 41 and/or a size of an overlapping work area (e.g., based on received work area information), and may selectively wait for the second vehicle 42 to exit the first work area 41, request the second vehicle 42 to exit the first work area 41, or negotiate a modification to one or more work areas and/or work area information associated with the one or more work areas based on the expected amount of time and/or the size of the overlapping work area. In some implementations, the vehicle 10 may first request that the second vehicle 42 exit the first work area 41, and if such request fails (e.g., based on a communication from the second vehicle 42 rejecting the request, based on a threshold amount of time elapsing without detecting that the second vehicle 42 has exited the first work area 41, and/or the like), then the vehicle 10 may negotiate a work area modification. In some implementations, the determination of which conflict resolution operation 44 to be performed may be based on one or more thresholds (e.g., a single threshold, a first threshold and a second threshold, and/or the like).

For example, if the expected amount of time does not satisfy a threshold (e.g., is less than or equal to the threshold), then the vehicle 10 may wait for the second vehicle 42 to exit the first work area 41. Conversely, if the expected amount of time satisfies a threshold (e.g., is greater than or equal to the threshold), then the vehicle 10 may request that the second vehicle 42 exits the first work area 41. Alternatively, if the expected amount of time satisfies a threshold (e.g., is greater than or equal to the threshold), or if the request to exit fails, then the vehicle 10 may negotiate a work a work area modification with the second vehicle 42.

Additionally, or alternatively, if the size of the overlapping work area does not satisfy a threshold (e.g., is less than or equal to the threshold), then the vehicle 10 may wait for the second vehicle 42 to exit the first work area 41. Conversely, if the size of the overlapping work area satisfies a threshold (e.g., is greater than or equal to the threshold), then the vehicle 10 may request that the second vehicle 42 exits the first work area 41. Alternatively, if the size of the overlapping work area satisfies a threshold (e.g., is greater than or equal to the threshold), or if the request to exit fails, then the vehicle 10 may negotiate a work a work area modification with the second vehicle 42.

A work area modification may include, for example, modifying a size of a work area, modifying a shape of a work area, modifying a work schedule associated with the work area, and/or the like. For example, the vehicle 10 may detect a conflict for the first work area 41, and may reduce a size of the first work area 41. Additionally, or alternatively, the second vehicle 42 may reduce a size of the second work area 43. In some implementations, the size(s) may be reduced to eliminate any overlap in the work areas 41, 43 during a same time period. For example, the vehicle 10 may work in a smaller work area 45 for a first time period, and the second vehicle 42 may work in a smaller work area 46 for the first time period, where the work area 45, 46 do not overlap. Once both vehicles 10, 42 have completed performing operations in these smaller work areas 45, 46, the vehicle 10 may work in a different work area 47 for a second time period, and the second vehicle 42 may work in a different work area 48 for the second time period, where the work areas 47, 48 do not overlap. In this way, vehicle collisions and interference may be avoided.

In some implementations, the modified work areas 45, 46, 47, 48 may be determined based on boundaries of the work areas 41, 43, an overlap between the work areas 41, 43, and/or one or more work schedules associated with the work areas 41, 43. For example, such information may be used as input to a set of rules (e.g., an algorithm, a machine learning model, and/or the like), which may output the modified work areas 45, 46, 47, 48 in a way that minimizes work time, ensures that operations are performed in a correct order, and/or the like. In some implementations, the vehicle 10 may reserve and/or operate in corresponding modified work areas 45, 47, and/or the second vehicle 42 may reserve and/or operate in corresponding modified work areas 46, 48, in a similar manner as described above in connection with FIG. 3.

In some implementations, operations of one of the vehicles 10, 42 may be prioritized (e.g., performed first) over the other vehicle 10, 42 for the entire overlapping work area or a portion of the overlapping work area. For example, operations of the vehicles 10, 42 may be associated with an order in which the operations are to be performed, and the operation that is to be performed first may be prioritized. Additionally, or alternatively, a vehicle may be prioritized based on the type of a vehicle. For example, a particular type of vehicle, such as a grader, may typically performs operation before another type of vehicle, such as a paver. Additionally, or alternatively, a particular type of vehicle, such as a fuel truck, may need to perform operations (e.g., refueling) to permit other vehicles to perform operations.

Additionally, or alternatively, a vehicle may be prioritized based on the type of a vehicle, a speed of the vehicle, and/or the like. For example, smaller sized vehicles and/or faster vehicles may be prioritized for safety reasons. Additionally, or alternatively, a vehicle may be prioritized based on an expected amount of time that the vehicle is to be present in the work area. For example, a vehicle with a shorter expected time in the work area may be prioritized over a vehicle with a longer expected time in the work area for efficiency.

In some implementations, the vehicle 10 may determine that a conflict with the second vehicle 42 could not be resolved without operator input. In this case, the vehicle 10 may request operator input to resolve the conflict. In this way, work stoppages may be avoided when the vehicle 10, 42 cannot autonomously resolve work area conflicts.

Although operations are described herein in connection with a first vehicle 10 and a second vehicle 42, similar operations may be performed in connection with one or more other vehicles. For example, operations described as being performed between the first vehicle 10 and the second vehicle 42 may additionally or alternatively be performed between the first vehicle 10 and one or more other vehicles, between the second vehicle 42 and one or more other vehicles, and/or between multiple vehicles other than the first vehicle 10 and the second vehicle 42.

As indicated above, FIG. 4 is provided as an example. Other examples are possible and may differ from what was described in connection with FIG. 4.

FIG. 5 is a diagram illustrating an example process 50 performed, for example, by management system 16 and/or vehicle 10. Example process 50 is an example where management system 16 and/or vehicle 10 performs operations associated with managing work area reservations for vehicle 10.

As shown in FIG. 5, in some implementations, process 50 may include determining a work area to be reserved for an autonomous operation of an autonomous vehicle (block 51). For example, the vehicle 10 (e.g., using one or more components of management system 16) may determine a work area to be reserved for an autonomous operation of the autonomous vehicle, as described above in connection with FIGS. 3-4.

As further shown in FIG. 5, in some implementations, process 50 may include broadcasting a request to reserve the work area for the autonomous vehicle (block 52). For example, the vehicle 10 (e.g., using one or more components of management system 16) may broadcast a request to reserve the work area for the autonomous vehicle, as described above in connection with FIGS. 3-4.

As further shown in FIG. 5, in some implementations, process 50 may include determining whether a communication, that indicates a reservation conflict for the work area, has been received by the autonomous vehicle (block 53). For example, the vehicle 10 (e.g., using one or more components of management system 16) may determine whether a communication, that indicates a reservation conflict for the work area, has been received by the autonomous vehicle, as described above in connection with FIGS. 3-4.

As further shown in FIG. 5, in some implementations, process 50 may include selectively reserving the work area and performing the autonomous operation in the work area based on determining whether the communication has been received by the autonomous vehicle (block 54). For example, the vehicle 10 (e.g., using one or more components of management system 16, one or more controllers 27, and/or the like) may selectively reserve the work area and perform the autonomous operation in the work area based on determining whether the communication has been received by the autonomous vehicle, as described above in connection with FIGS. 3-4.

As further shown in FIG. 5, in some implementations, process 50 may include broadcasting, during the autonomous operation, one or more signals identifying the work area (block 55). For example, the vehicle 10 (e.g., using one or more components of management system 16) may broadcast, during the autonomous operation, one or more signals identifying the work area, as described above in connection with FIGS. 3-4.

As further shown in FIG. 5, in some implementations, process 50 may include determining that the autonomous operation has been completed (block 56). For example, the vehicle 10 (e.g., using one or more components of management system 16) may determine that the autonomous operation has been completed, as described above in connection with FIGS. 3-4.

As further shown in FIG. 5, in some implementations, process 50 may include stopping the broadcasting of the one or more signals identifying the work area based on determining that the autonomous operation has been completed (block 57). For example, the vehicle 10 (e.g., using one or more components of management system 16) may stop the broadcasting of the one or more signals identifying the work area based on determining that the autonomous operation has been completed, as described above in connection with FIGS. 3-4.

Process 50 may include additional implementations, such as any single implementation or any combination of implementations described below and/or in connection with one or more other processes described elsewhere herein.

In some implementations, the vehicle 10 may detect a conflict for the work area based on receiving the communication prior to reserving the work area, receiving the communication during the autonomous operation, or sensing an intruding object in the work area during the autonomous operation. In some implementations, the vehicle 10 may detect a conflict for the work area; determine an expected amount of time that an intruding vehicle is to be present in the work area based on detecting the conflict; and selectively wait for the intruding vehicle to exit the work area, request the intruding vehicle to exit the work area, or negotiate a modification to one or more work areas or work schedules associated with the one or more work areas based on the expected amount of time.

In some implementations, the vehicle 10 may detect a conflict for the work area; determine an intruding work area associated with an intruding vehicle present in the work area or for which at least a portion of the work area is reserved; and reduce a size of the work area based on the intruding work area. In some implementations, the vehicle 10 may detect a conflict for the work area; and negotiate a work area modification with an intruding vehicle present in the work area or for which at least a portion of the work area is reserved. In some implementations, the work area modification includes at least one of: a modification to a size of the work area of the autonomous vehicle, a modification to a size of an intruding work area associated with the intruding vehicle, a modification to a work schedule of the autonomous vehicle in connection with the work area, or a modification to a work schedule of the intruding vehicle in connection with the intruding work area.

In some implementations, the vehicle 10 may detect a conflict with an intruding vehicle for the work area; and request operator input to resolve the conflict based on a determination that a negotiation with the intruding vehicle failed to resolve the conflict. In some implementations, the work area is defined by a set of geographic coordinates, and performing the autonomous operation comprises moving within a boundary defined by the set of geographic coordinates.

In some implementations, the vehicle 10 may detect a conflict with an intruding vehicle for the work area; and prioritize the autonomous operation of the autonomous vehicle or an intruding operation of the intruding vehicle for the work area based on at least one of: an order in which the autonomous operation and the intruding operation are to be performed, a vehicle type of the autonomous vehicle or the intruding vehicle, a size of the autonomous vehicle or the intruding vehicle, a speed of the autonomous vehicle or the intruding vehicle, or an expected amount of time that the autonomous vehicle or the intruding vehicle is to be present in the work area.

In some implementations, the vehicle 10 may detect a conflict with an intruding vehicle for the work area; and selectively wait to perform the autonomous operation until the intruding vehicle exits the work area or negotiate one or more work area modifications based on at least one of: an expected amount of time that the intruding vehicle is to be present in the work area, or a size of an intruding work area associated with the intruding vehicle.

In some implementations, the vehicle 10 may detect a conflict with an intruding vehicle for the work area; transmit a request to the intruding vehicle to exit the work area based on detecting the conflict; determine that the intruding vehicle has rejected the request or that the intruding vehicle has not exited the work area after a threshold amount of time has elapsed since the request was transmitted; and negotiate one or more work area modifications with the intruding vehicle based on determining that the intruding vehicle has rejected the request or that the intruding vehicle has not exited the work area after the threshold amount of time has elapsed since the request was transmitted.

In some implementations, the vehicle 10 may detect a conflict with an intruding vehicle for the work area; and negotiate a first modification to the work area of the autonomous vehicle and a second modification to an intruding work area associated with the intruding vehicle based on detecting the conflict. In some implementations, the first modification and the second modification are determined based on at least one of: a boundary of the work area, a boundary of the intruding work area, an overlap between the work area and the intruding work area, a work schedule of the autonomous vehicle with respect to the work area, or a work schedule of the intruding vehicle with respect to the work area.

In some implementations, the request is transmitted via at least one of a vehicle-to-everything (V2X) communication or a wireless communication to a central server. In some implementations, the determination of whether the communication has been received includes determining whether a V2X communication or a wireless communication from the central server has been received.

Although FIG. 5 shows example blocks of process 50, in some implementations, process 50 may include additional blocks, fewer blocks, different blocks, or differently arranged blocks than those depicted in FIG. 5. Additionally, or alternatively, two or more of the blocks of process 50 may be performed in parallel.

FIG. 6 is a diagram illustrating another example process 60 performed, for example, by management system 16 and/or vehicle 10. Example process 60 is another example where management system 16 and/or vehicle 10 performs operations associated with managing work area reservations for vehicle 10.

As shown in FIG. 6, in some implementations, process 60 may include determining a first work area associated with an autonomous operation of the first vehicle (block 61). For example, the vehicle 10 (e.g., using one or more components of management system 16) may determine a first work area associated with an autonomous operation of the first vehicle, as described above in connection with FIGS. 3-4.

As further shown in FIG. 6, in some implementations, process 60 may include detecting a conflict with a second vehicle for the first work area (block 62). For example, the vehicle 10 (e.g., using one or more components of management system 16) may detect a conflict with a second vehicle for the first work area, as described above in connection with FIGS. 3-4.

As further shown in FIG. 6, in some implementations, process 60 may include negotiating, with the second vehicle, a work area modification associated with the first work area or a second work area associated with the second vehicle (block 63). For example, the vehicle 10 (e.g., using one or more components of management system 16) may negotiate, with the second vehicle, a work area modification associated with the first work area or a second work area associated with the second vehicle, as described above in connection with FIGS. 3-4. In some implementations, the work area modification includes at least one of: a modification to a size of the first work area, a modification to a size of the second work area, a modification to a first work schedule of the first vehicle with respect to the first work area, or a modification to a second work schedule of the second vehicle with respect to the first work area.

As further shown in FIG. 6, in some implementations, process 60 may include determining a modified work area based on the work area modification (block 64). For example, the vehicle 10 (e.g., using one or more components of management system 16) may determine a modified work area based on the work area modification, as described above in connection with FIGS. 3-4.

As further shown in FIG. 6, in some implementations, process 60 may include reserving the modified work area and performing the autonomous operation in the modified work area based on determining the modified work area (block 65). For example, the vehicle 10 (e.g., using one or more components of management system 16, one or more controllers 27, and/or the like) may reserve the modified work area and perform the autonomous operation in the modified work area based on determining the modified work area, as described above in connection with FIGS. 3-4.

Process 60 may include additional implementations, such as any single implementation or any combination of implementations described below and/or in connection with one or more other processes described elsewhere herein.

In some implementations, the conflict is detected based on at least one of: receiving a communication, that indicates a reservation conflict for the first work area, prior to reserving the first work area, in connection with a request to reserve the first work area for the first vehicle, receiving the communication while performing the autonomous operation, or sensing the second vehicle in the first work area while performing the autonomous operation.

In some implementations, the vehicle 10 may broadcast, while the autonomous operation is being performed, one or more signals identifying the modified work area. In some implementations, the vehicle 10 may determine that the autonomous operation has been completed; and stop the broadcasting of the one or more signals identifying the modified work area based on determining that the autonomous operation has been completed.

Although FIG. 6 shows example blocks of process 60, in some implementations, process 60 may include additional blocks, fewer blocks, different blocks, or differently arranged blocks than those depicted in FIG. 6. Additionally, or alternatively, two or more of the blocks of process 60 may be performed in parallel.

INDUSTRIAL APPLICABILITY

Management system 16, as described herein, may be utilized for methods of managing work area reservations and/or work area conflicts for vehicle 10 (e.g., an autonomous vehicle, which may include a semi-autonomous vehicle). Because work sites are dynamic environments where conditions can change rapidly, an autonomous vehicle may have difficulty responding to such changes. For example, if another machine, vehicle, personnel, and/or the like encroaches upon a work area of the autonomous vehicle, the autonomous vehicle may need to shut down or delay the work for the work area until operator input is received, thereby causing delays and leading to inefficiencies. By employing the methods described herein, such shut downs and delays can be reduced or eliminated by autonomous resolution of work area conflicts.

The detailed description of example implementations of the disclosure herein makes reference to the accompanying drawings and figures, which show the example implementations by way of illustration only. While these example implementations are described in sufficient detail to enable those skilled in the art to practice the disclosure, it should be understood that other implementations may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation.

What is claimed is:

1. A method of managing autonomous vehicle work area reservations performed by an autonomous vehicle, comprising:
   determining a work area to be reserved for an autonomous operation of the autonomous vehicle;
   broadcasting a request to reserve the work area for the autonomous vehicle;
   determining, after broadcasting the request to reserve the work area for the autonomous vehicle and before selectively reserving the work area, whether a communication, that indicates a reservation conflict for the work area, has been received by the autonomous vehicle;
   selectively reserving the work area and performing the autonomous operation in the work area based on determining whether the communication has been received by the autonomous vehicle;
   broadcasting, during the autonomous operation, one or more signals identifying the work area;
   determining that the autonomous operation has been completed; and
   stopping the broadcasting of the one or more signals identifying the work area based on determining that the autonomous operation has been completed.

2. The method of claim 1, further comprising:
   detecting a conflict for the work area based on receiving the communication prior to reserving the work area, receiving the communication during the autonomous operation, or sensing an intruding object in the work area during the autonomous operation.

3. The method of claim 1, further comprising:
   detecting a conflict for the work area;
   determining an expected amount of time that an intruding vehicle is to be present in the work area based on detecting the conflict; and
   selectively waiting for the intruding vehicle to exit the work area, requesting the intruding vehicle to exit the work area, or negotiating a modification to one or more work areas or work schedules associated with the one or more work areas based on the expected amount of time.

4. The method of claim 1, further comprising:
   detecting a conflict for the work area;
   determining an intruding work area associated with an intruding vehicle present in the work area or for which at least a portion of the work area is reserved; and
   reducing a size of the work area based on the intruding work area.

5. The method of claim 1, further comprising:
   detecting a conflict for the work area; and
   negotiating a work area modification with an intruding vehicle present in the work area or for which at least a portion of the work area is reserved.

6. The method of claim 5, wherein the work area modification includes at least one of:

a modification to a size of the work area of the autonomous vehicle,
a modification to a size of an intruding work area associated with the intruding vehicle,
a modification to a work schedule of the autonomous vehicle in connection with the work area, or
a modification to a work schedule of the intruding vehicle in connection with the intruding work area.

7. The method of claim 1, further comprising:
detecting a conflict with an intruding vehicle for the work area; and
requesting operator input to resolve the conflict based on a determination that a negotiation with the intruding vehicle failed to resolve the conflict.

8. The method of claim 1, wherein the work area is defined by a set of geographic coordinates, and
wherein performing the autonomous operation comprises moving within a boundary defined by the set of geographic coordinates.

9. A system, included in an autonomous vehicle, for managing work area reservations of the autonomous vehicle, comprising:
a wireless communication component; and
one or more processors, operatively coupled to the wireless communication component, wherein the wireless communication component and the one or more processors are configured to:
receive an indication of a work area to be reserved for an autonomous operation of the autonomous vehicle;
broadcast a request to reserve the work area for the autonomous vehicle;
determine, after broadcasting the request to reserve the work area for the autonomous vehicle and before selectively reserving the work area, whether a communication, that indicates a reservation conflict for the work area, has been received;
selectively reserve the work area and instructing one or more controllers of the autonomous vehicle to perform the autonomous operation in the work area based on determining whether the communication has been received by the autonomous vehicle; and
broadcast, during the autonomous operation, one or more signals identifying the work area.

10. The system of claim 9, wherein the wireless communication component and the one or more processors are further configured to:
determine that the autonomous operation has been completed; and
stop broadcasting the one or more signals identifying the work area based on determining that the autonomous operation has been completed.

11. The system of claim 9, wherein the wireless communication component and the one or more processors are further configured to:
detect a conflict with an intruding vehicle for the work area; and
prioritize the autonomous operation of the autonomous vehicle or an intruding operation of the intruding vehicle for the work area based on at least one of:
an order in which the autonomous operation and the intruding operation are to be performed,
a vehicle type of the autonomous vehicle or the intruding vehicle,
a size of the autonomous vehicle or the intruding vehicle,
a speed of the autonomous vehicle or the intruding vehicle, or
an expected amount of time that the autonomous vehicle or the intruding vehicle is to be present in the work area.

12. The system of claim 9, wherein the wireless communication component and the one or more processors are further configured to:
detect a conflict with an intruding vehicle for the work area; and
selectively wait to perform the autonomous operation until the intruding vehicle exits the work area or negotiate one or more work area modifications based on at least one of:
an expected amount of time that the intruding vehicle is to be present in the work area, or
a size of an intruding work area associated with the intruding vehicle.

13. The system of claim 9, wherein the wireless communication component and the one or more processors are further configured to:
detect a conflict with an intruding vehicle for the work area;
transmit a request to the intruding vehicle to exit the work area based on detecting the conflict;
determine that the intruding vehicle has rejected the request or that the intruding vehicle has not exited the work area after a threshold amount of time has elapsed since the request was transmitted; and
negotiate one or more work area modifications with the intruding vehicle based on determining that the intruding vehicle has rejected the request or that the intruding vehicle has not exited the work area after the threshold amount of time has elapsed since the request was transmitted.

14. The system of claim 9, wherein the wireless communication component and the one or more processors are further configured to:
detect a conflict with an intruding vehicle for the work area; and
negotiate a first modification to the work area of the autonomous vehicle and a second modification to an intruding work area associated with the intruding vehicle based on detecting the conflict.

15. The system of claim 14, wherein the first modification and the second modification are determined based on at least one of:
a boundary of the work area,
a boundary of the intruding work area,
an overlap between the work area and the intruding work area,
a work schedule of the autonomous vehicle with respect to the work area, or
a work schedule of the intruding vehicle with respect to the work area.

16. The system of claim 9, wherein the request is transmitted via at least one of a vehicle-to-everything (V2X) communication or a wireless communication to a central server; and
wherein the determination of whether the communication has been received includes determining whether a V2X communication or a wireless communication from the central server has been received.

17. A method of managing autonomous vehicle work area reservations performed by a first vehicle, comprising:
determining a first work area associated with an autonomous operation of the first vehicle;
detecting a conflict with a second vehicle for the first work area;

negotiating, with the second vehicle, a work area modification associated with the first work area or a second work area associated with the second vehicle, wherein the work area modification includes at least one of:
  a modification to a size of the first work area,
  a modification to a size of the second work area,
  a modification to a first work schedule of the first vehicle with respect to the first work area, or
  a modification to a second work schedule of the second vehicle with respect to the first work area;
determining a modified work area based on the work area modification; and
reserving the modified work area and performing the autonomous operation in the modified work area based on determining the modified work area.

18. The method of claim 17, wherein the conflict is detected based on at least one of:
  receiving a communication, that indicates a reservation conflict for the first work area, prior to reserving the first work area, in connection with a request to reserve the first work area for the first vehicle,
  receiving the communication while performing the autonomous operation, or
  sensing the second vehicle in the first work area while performing the autonomous operation.

19. The method of claim 17, further comprising:
broadcasting, while the autonomous operation is being performed, one or more signals identifying the modified work area.

20. The method of claim 19, further comprising:
determining that the autonomous operation has been completed; and
stopping the broadcasting of the one or more signals identifying the modified work area based on determining that the autonomous operation has been completed.

* * * * *